Dec. 8, 1964    J. T. CARPENTER    3,159,880
COTTON WAD BREAKER
Filed June 27, 1962
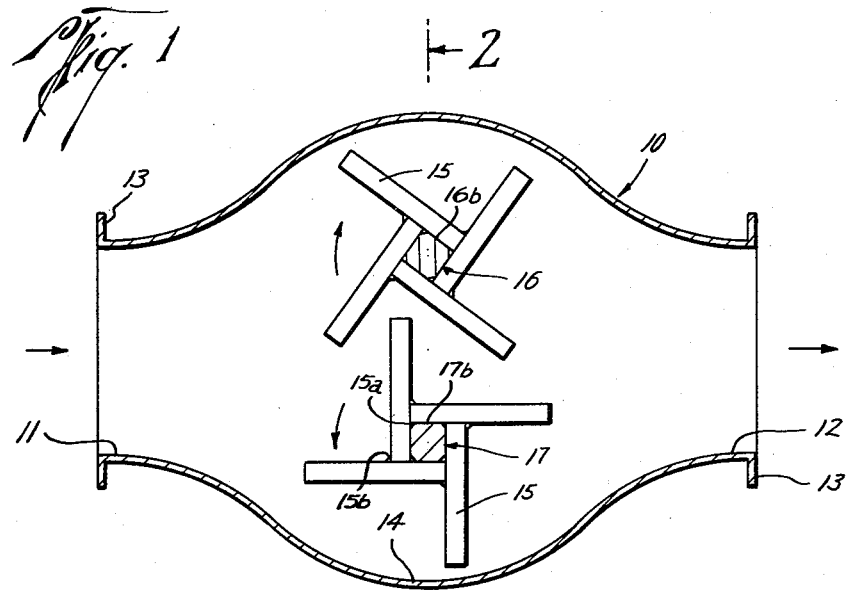
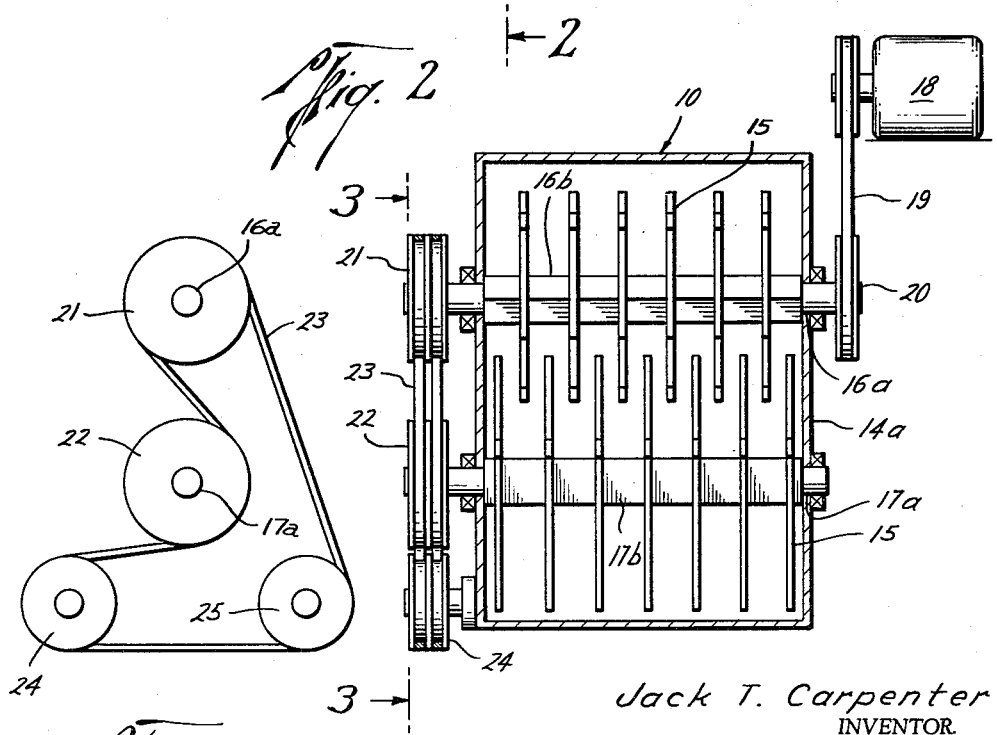
Jack T. Carpenter
INVENTOR
BY Browning, Simms, Hyer & Eickenroht
ATTORNEYS & # 3,159,880
COTTON WAD BREAKER
Jack T. Carpenter, Box 192, Chapman Ranch, Tex.
Filed June 27, 1962, Ser. No. 205,780
2 Claims. (Cl. 19—82)

This invention relates to improved apparatus for breaking up wads of twisted or roped cotton as they are picked up in a conduit for delivery to the vacuum separator of conventional cotton ginning equipment.

As is well known to those skilled in this art, machine-picked cotton becomes roped or twisted because of the wet pick up spindles on the mechanical picker. The wads so formed may be five to six feet long and, unless broken up in some manner, they may choke the revolving screen of the separator, or, in some cases, they may choke the transition from the conduit to the separator housing about the screen.

In prior apparatus for this general purpose, such as shown in Steele Patent No. 2,681,474, the cotton wads are pulled through a housing arranged upstream of the separator and having a rotatable shaft with blades disposed thereacross. However, the capacity of this apparatus is limited, and my attempts to increase it have been unsuccessful. For example, an increased volume of cotton flow through the Steele apparatus has caused either the separator or the transition to be choked. On the other hand, increasing the speed of rotation of the blades has not proven to be a practical way of increasing the capacity of such apparatus. For one thing, cotton at this stage of the ginning process contains a good deal of dirt which may be beaten into the wads in the event the blades are rotated too fast. Also, if the blades are rotated much faster than the suction flow through the conduit, the wads of cotton are not allowed to spread before reaching the separator.

An object of my invention is to provide a wad breaker of this general type which has a much greater capacity than the earlier apparatus above described, but which is of simplified and inexpensive construction and does not require material alteration of the conventional ginning equipment with which it is connected.

A further object is to provide a wad breaker of the general type above described in which the blades are mounted on each shaft in a more secure and less complicated fashion than they are mounted in the prior apparatus.

These and other objects are accomplished, in accordance with the illustrated embodiment of this invention, by a cotton wad breaker which, similarly to the prior apparatus above described, comprises a longitudinally extending housing having an inlet and outlet connectable in the conduit leading to the vacuum separator. However, as distinguished from this earlier apparatus, there are a pair of bladed shafts extending across the housing in substantially parallel, laterally spaced-apart relation, and the ends of the blades of one shaft overlap with and are spaced from the ends of the blades of the other shaft as the shafts are rotated within the housing. More particularly, I provide means for rotating the shafts in opposite directions so as to cause the overlapping ends of the blades to move toward the inlet and thus opposite to the flow through the housing.

Thus, as the wads of cotton enter the inlet to the housing of my breaker, some of them will pass between the top of the housing and the upper ends of the blades on the upper shaft, while others will pass between the bottom of the housing and the lower ends of the blades on the lower shaft. In each case, however, the wads will be broken up by the rotating blades which will initially strike the wads and then slice through them as they move in the paths above described. The movement of the overlapping ends of the blades toward the inlet will prevent all but a small amount of the wads from moving between the shafts, and even if some of the wads should pass between the shafts, they will be struck and sliced by the overlapping ends of the blades. In fact, this counterflow movement of the blade ends at the center of the housing will cause substantially more agitation, and thus increased wad breaking action, than would occur in the event the blade ends were moving in the same direction as the flow through the housing.

In accordance with another novel aspect of the present invention, each shaft of my wad breaker or, for that matter, the single shaft of the Steele wad breaker, has a polygonal and preferably square portion intermediate round ends which are rotatably mountable in the sides of the housing. Blades are arranged in clusters about the polygonal shaft portion and spaced apart along the length thereof, with a side edge of each blade of a cluster being welded adjacent a side of the polygonal shaft portion and the end thereof being welded against the side edge of an adjacent blade in the cluster. Thus, in the assembly of the bladed shaft, the blades need merely be laid up against the shaft and an adjacent blade and welded along two side edges.

In the drawings, wherein like reference characters are used throughout the designated like parts:

FIG. 1 is a longitudinal cross-sectional view of a wad breaker constructed in accordance with the present invention;

FIG. 2 is a cross-sectional view of the wad breaker shown in FIG. 1, as seen along broken line 2—2 thereof; and FIG. 3 is a side view of the preferred mechanism for driving the shafts of the wad breaker in the manner described, as seen along broken line 3—3 of FIG. 2.

With reference now to the detail of the above-described drawings, the wad breaker comprises a housing 10 having a rectangular inlet 11 thereto aligned with a rectangular outlet 12 therefrom, each of the inlet and outlet being of the same size and provided with a flanged end 13 for connection within the conduit. As well known to those skilled in the art and as described in the aforementioned Steele patent, the portion of the conduit connecting with the inlet 11 provides an intake to which the wads of cotton are introduced, and the portion of the conduit connecting with outlet 12 comprises a transition connecting with the housing of the vacuum separator. Thus, the vacuum in the separator will pull the cotton from the intake, through the wad breaker housing 10, and into the housing about the revolving drum.

The housing 10 is preferably constructed of sheet metal and has an enlarged interior portion 14 intermediate the inlet and outlet which is rectangular in cross section, as shown in FIG. 2, and longitudinally curved, as shown in FIG. 1, for disposal closely adjacent the ends of blades 15 mounted upon upper and lower shafts 16 and 17. As indicated by the arrows in FIG. 1, the upper shaft is rotated in a clockwise direction and the lower shaft in a counterclockwise direction, so that as previously described, substantially all of the wads of cotton will pass between the upper ends of the blades on upper shaft 16 and the top side of the housing and between the lower ends of the blades on the lower shaft 17 and the bottom side of the housing.

As shown in FIG. 2, the ends 16a and 17a of the shafts 16 and 17, respectively, are round and rotatably mounted within suitable bearings in the sides 14a of the housing 14. However, as previously mentioned, the intermediate portions 16b and 17b of the two shafts are multi-sided—in this case square. As also described above, the blades 15 are mounted in clusters of four, with each blade of the cluster being connected to the intermediate shaft portion and an adjacent blade by a weld 15a between one of its side edges and a side of the square shaft portion as well as a weld 15b between its end adjacent said side edge and the side edge of the adjacent blade.

The shafts 16 and 17 are disposed in substantially parallel and laterally spaced-apart relation with respect to the longitudinal extending housing. More particularly, the axes of rotation of the shafts lie in a plane which is at least substantially perpendicular to the aligned inlet 11 and outlet 12, thereby defining a laterally extending space between the shafts. As can be seen from FIGS. 1 and 2, the blades overlap within the space during rotation of the shafts. As shown in FIG. 2, the clusters of blades on the two shafts, and particularly the overlapping ends thereof, are spaced apart along the lengths of the shafts to provide fairly large spaces therebetween.

I contemplate, for example, that the blades may be approximately 5/16 of an inch thick and spaced apart on each shaft approximately 4¼ inch on centers. Thus, the 5/16 inch wide overlapping end of each blade would move, when in an overlapping portion of its rotative cycle, within a space approximately 4 inches wide between the ends of blades of adjacent clusters on the other shaft. With blades spaced in this manner, I also contemplate that the shafts may be laterally spaced apart a distance of 8 inches and blades may be of such length as to overlap for a maximum length of 3 to 4 inches. It is not important, in this respect, that the rotation of the shafts be synchronized or timed with respect to one another, and, for this reason, I am able to use the simplified means for simultaneously rotating the shafts which is best shown in FIG. 3.

As shown in FIGS. 1 and 2, the upper ends of the blades on the upper shaft and the lower ends of the blades on the lower shaft move rather close to the top and bottom, respectively, of the enlarged interior portion 14 of the housing. This spacing, which may be approximately 1½ inches in a wad breaker having the other dimensions above described, must not be so small as to cause the wads to be clogged between the ends of the blades and the housing. On the other hand, this spacing should be sufficiently small that the wads will not move past the housing without some breaking action.

As previously described, the shafts are rotated in opposite directions, and, more particularly, in directions which will cause their overlapping ends to move toward the inlet. As previously explained, this not only reduces to a minimum the number of wads which pass through the space between the shafts, but also provides a maximum of breaking action upon those wads which are directed from the central portion of the housing into the two paths above and below the upper and lower shafts.

The preferred means for accomplishing this simultaneous rotation of the shaft comprises a motor 18 mounted in any suitable fashion for driving one of the shafts, such as the shaft 16, by means of a belt 19 disposed about a pulley 20 on the outer end of said shaft. As shown in FIGS. 2 and 3, there is another pulley 21 on the opposite outer end of the shaft 16 as well as a pulley 22 on the adjacent outer end of the other shaft 17. A pair of belts 23 extend between the pulleys 21 and 22 as well as about idler pulleys 24 and 25. More particularly, and as shown in FIG. 3, the belts 23 are guided about the lower side of pulley 21 and extended diagonally therefrom to the upper side of the pulley 22, to obtain the desired oppositely disposed rotation of the shafts. Even though there may be slippage of the belts, this is of no great concern because, as above mentioned, it is not necessary that the rotation of the shafts be synchronized. Obviously, the belts and pulleys are shown only diagrammatically in FIG. 2 and may be of conventional V-shape or modifications thereof.

I have found that a wad breaker having the general dimensions previously described is suitable for use in ginning equipment having 13 inch to 15 inch suction lines and a 40 inch—50 inch suction fan. With a wad breaker so constructed, and rotating the blades at about 450 r.p.m., I have been able to raise the capacity of the ginning equipment from approximately 7 to 8 bales an hour to approximately 12 bales an hour. More particularly, this has been accomplished without pounding dirt into the wads, and further without choking either the transition or the screen of the vacuum separator.

In larger ginning equipment, I would prefer to use a corresponding wad breaker. Also, it may be found possible, particularly in larger gins, to use two or more wad breakers in tandem and thereby effect even greater separation.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. For use in cotton ginning equipment which includes a conduit through which wads of cotton are pulled from an intake to a vacuum separator, a breaker for the wads comprising a longitudinally extending housing having an aligned inlet and outlet at its opposite ends for connection in the conduit, a pair of shafts extending across the housing in substantially parallel, laterally spaced-apart relation with their axes lying in a plane substantially perpendicular to the aligned inlet and outlet, each shaft having fixed blades extending therefrom and spaced along the length thereof and arranged in rows along the length of the shaft, the ends of the blades of the rows of one shaft overlapping with and being laterally spaced from the ends of the blades of the rows of the other shaft during rotation of the shafts, and means for rotating the shafts in opposite directions to cause the ends of the blades to move toward the inlet as they overlap with one another, said housing being free of obstructions between the inlet and said blades, each of the inlet and outlet being spaced longitudinally of the ends of the blades of the shafts, and the interior of the housing intermediate the inlet and outlet comprising oppositely facing walls which include circular portions curved for disposal closely adjacent the ends of the blades and end portions which slope gradually outwardly in a longitudinal direction to connect said curved portions with said inlet and outlet.

2. A cotton wad breaker of the character defined in claim 1, wherein the overlapping ends of the blades are at least substantially equally spaced from one another, and the shafts are rotated at substantially equal speeds by said rotating means.

References Cited by the Examiner

UNITED STATES PATENTS

| 917,318 | 4/09 | Lamb | 19—38 |
|---|---|---|---|
| 1,203,710 | 11/16 | Dickerson | 19—94 X |
| 1,233,514 | 7/17 | Scott | 19—82 |
| 1,445,379 | 2/23 | Woodford | 19—200 |
| 1,602,465 | 10/26 | Swanson | 19—144 |
| 2,540,021 | 1/51 | Wright | 241—236 |

FOREIGN PATENTS 24,885  10/51  Finland.

RUSSELL C. MADER, *Primary Examiner.*

DONALD W. PARKER, *Examiner.*